United States Patent [19]

Pope et al.

[11] Patent Number: 4,781,066
[45] Date of Patent: Nov. 1, 1988

[54] LINEAR SENSING APPARATUS FOR POSITIVE DISPLACEMENT METER

[75] Inventors: Kenneth L. Pope, Walkertown; John S. McSpadden, Greensboro, both of N.C.

[73] Assignee: Gilbarco Inc., Greensboro, N.C.

[21] Appl. No.: 899,324

[22] Filed: Aug. 22, 1986

[51] Int. Cl.$^4$ .............................................. G01F 3/18
[52] U.S. Cl. ........................................ 73/239; 73/247
[58] Field of Search .......... 73/239, 243, 247, 262–264; 324/207, 208, 251

[56] References Cited

U.S. PATENT DOCUMENTS

| | | | |
|---|---|---|---|
| 2,892,346 | 6/1959 | Sargent | 73/239 X |
| 3,344,667 | 10/1967 | Maltby | 73/239 |
| 3,657,925 | 4/1972 | Gross | 73/239 |
| 4,124,814 | 11/1978 | Lauerman | 324/251 X |
| 4,307,729 | 12/1981 | Hart et al. | 73/239 X |
| 4,561,304 | 12/1985 | Max | 73/247 |

Primary Examiner—Herbert Goldstein
Attorney, Agent, or Firm—Kenneth Watov

[57] ABSTRACT

Linear sensing apparatus for a positive displacement meter includes relative to each piston of the meter, an elongated rectangular member rigidly attached at one end to the top face of its associated piston, and carrying at its other end a multiwindowed member that reciprocates back and forth with movement of the piston for alternately interrupting detectable energy flowing between energy transmitting and detecting devices, the detecting device converting the detected energy into alternating electrical signals analogous to the volume of fluid passed through the meter, whereafter the signals are processed via a microprocessor for obtaining the actual volume and/or price of the fluid passed through the meter over a given period of time.

19 Claims, 5 Drawing Sheets

LINEAR SENSING APPARATUS FOR POSITIVE DISPLACEMENT METER

FIELD OF THE INVENTION

The present invention relates to apparatus for sensing the linear position of a mechanical member, and more particularly relates to apparatus for direct linear sensing of the movement of a piston within a cylinder for providing electrical signals that are analogous to the volume displaced by the piston in its movement over that period of time.

BACKGROUND OF THE INVENTION

Many displacement measuring devices are known in the prior art. For example, in Spencer U.S. Pat. No. 2,861,345, a displacement measuring device is disclosed that utilized two diffraction gradings interposed between a light source and a light detector for detecting changes in a Moire fringe pattern as the diffraction gradings move relative to one another, in correspondence to the movement of a workpiece. Similarly, Cail U.S. Pat. No. 2,857,802 teaches the use of two diffraction gradings and a pair of photocell detectors for detecting movement of a workpiece.

In Sanford et al. U.S. Pat. No. 3,713,139, the displacement of a movable member relative to a fixed member is measured via a Moire fringe device for producing cyclic wave patterns upon movement of the movable member. A plurality of light sensors are included for detecting changes in the light wave pattern from the Moire fringe device, for producing signals that are processed by a logic network for determining or measuring the extent of movement and direction of movement of the mechanical member.

Another system for determining the extent of movement of a mechanical member, and/or the direction of movement, are disclosed in Erickson U.S. Pat. No. 3,768,911 which teaches the use of a centrally located double grading between two associated single defraction gradings, for providing a pair of Moire fringe-generating grading pairs in optical series, whereby signals from the pairs are added together for eliminating the need for a collimated light source, and for reducing the optics required in the system, in providing measurement of the motion of a mechanical member. Also, in Post U.S. Pat. No. 3,796,498, a single Moire fringe device including a light source on one side of a defraction grading, and a light detector on another side of the grading, for producing signals upon movement of a scale grading attached to a movable table, whereby an electronic control circuit converts the signals to pulses which are counted for determining the position of the table and providing positioning signals to a table motion control system for positioning the table in a predetermined manner. Other references teaching the use of some form of diffraction grading system or device for linearly determining the movement of a mechanical member are found in MacGovern U.S. Pat. No. 3,812,352; Burns et al. U.S. Pat. No. 3,833,303; Hock U.S. Pat. No. 3,891,321; Kaul et al. U.S. Pat. No. 4,176,276; and Grendelmeier U.S. Pat. No. 3,599,004.

Many devices and systems are also found in the prior art which detect the movement of a mechanical member for determining the rate of flow of a fluid material. For example, in Stenzel U.S. Pat. No. 3,150,360, a plunger partially housed in a cylinder through which gases flow, changes position relative to the rate of flow of the gas. A portion of the plunger is provided outside of the area of gas flow for movement between a light source and a photodetector, thereby permitting electro-optic detection of a range of movement of the plunger for determining high and low flow rates of the gas. A similar device is disclosed in Wiegmann U.S. Pat. No. 3,564,910 for detecting the rate of flow of a predetermined quantity of liquid from a cylinder, for determining the fuel comsumption of internal combustion engines.

In Adelman U.S. Pat. No. 3,156,115, a chopper disc is rotated by a fluid pump for either periodically interrupting light to a light sensor, or periodically changing the reluctance before a magnetic pick-up head, for producing electrical signals that are processed by a controller for providing an indication of the rate of fluid flow through the pump. In Kissel U.S. Pat. No. 3,814,935 a flow meter is provided by including a turbine wheel within the fluid flow path, whereby the turbine is spun by the fluid at a rotational speed proportional to the rate of flow of the fluid, while the turbine is used to chop light from a light source via reflection of the light from the turbine blades to a photodetector, for providing electrical signals analogous to the rate of flow of the fluid. Another flow meter disclosed in Heath et al. U.S. Pat. 4,362,052 includes a piston and cylinder arrangement, wherein fluid flow causes movement of piston, which in turn moves a rod connected to a linear capacitor, for changing the capacitance thereof, thereby providing a measurement via the changing capacitance of fluid flow, where changes in the capacitance are proportional to the movement of the piston.

In Head et al. PCT Publication No. W085/01800, a system for ultrasonically detecting the position of a piston within a cylinder is disclosed. An ultrasonic signal is transmitted from a transducer mounted on the wall of the cylinder to a target zone on the piston, whereby the length of time for the transducer to receive back a reflected signal is measured via a microprocessor for providing digital signals indicative of the position of the piston within the cylinder from some datum point.

In known fluid dispensing systems, such as gasoline pumping systems, it is required that quantity of fluid dispensed to a customer be accurately measured, in order to fairly price the fluid delivered. In a typical gasoline distribution system, such as found in service stations, gasoline is pumped under pressure via a motorized pump to a positive placement meter. As the gasoline is forced through the meter, this causes a pair of pistons within the meter to move in a reciprocating manner, wherein the measurement of the extent of movement of the pistons is indicative of the volume of fluid passed through the meter prior to delivery to a nozzle for distribution to a customer. Many such systems convert the linear motion of the pistons to a rotary motion via cams or cam shafts for rotating a mechanical member, such as a chopper wheel or disc, for example, to "chop" light between a light source and a photodetector, for providing electrical signals corresponding to the movement of the pistons. Such systems are subject to error as mechanical wear in the meter components causes changes in the stroke length of the pistons, which changes are not compensated for via the linear to rotary conversion system.

SUMMARY OF THE INVENTION

An object of the present invention is to provide a self-calibrating detection system for a positive displacement meter.

Another object of the invention is to provide a detection system for a positive displacement meter that automatically compensates for wear or deterioration of the mechanical portions of the meter that cause changes in the stroke of the piston or pistons of the meter.

Another object of the invention is to provide a linear sensing mechanism for a positive displacement meter.

Yet another object of the invention is to provide an improved positive displacement meter system.

With these objects in mind, the present invention overcomes the problems in the prior art by including in a positive displacement meter having at least one piston, and associated with each piston a linear sensor comprising an elongated rectangular member rigidly connected to the top of a piston, with the other end of the member protruding through the top of the cylinder housing the piston, for in one embodiment moving a diffraction grading integral with the other end of the member between a light source and a photodetector, and in another embodiment moving a slotted magnetically permeable strip integral with the other end of the member, for alternately interrupting and permitting the flow of magnetic flux through an aperture to a transducer means, for producing electrical signals corresponding to the linear movement of the associated piston, the signals being provided to a microprocessor programmed for computing from the signals the (1) product of the linear movement of the piston and the cross-sectional area of the top of the piston, for obtaining the volume of liquid passed through the meter over a given period of time, and (2) the product of the volume and the cost per unit volume, for determining the total cost of the liquid dispensed over that time.

BRIEF DESCRIPTION OF THE DRAWINGS

In the drawing, wherein like items are indicated by the same reference number.

DESCRIPTION OF THE PREFERRED EMBODIMENT OF THE INVENTION

Figure 1:
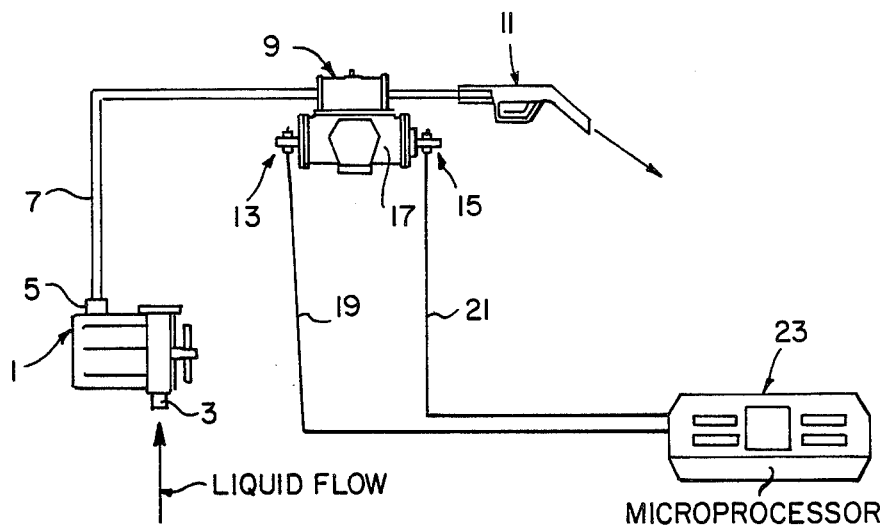
FIG. 1 shows a pumping system including one embodiment of the present invention.

With reference to FIG. 1, a typical pumping system for dispensing liquid, such as gasoline, for example, consists of a motorized pump 1 one for drawing liquid from a storage tank (not shown) via an inlet port 3, and delivering the liquid under pressure from an outlet port 5 into a hose or conduit 7 for delivery to a positive displacement meter 9. The liquid is forced through the positive displacement meter 9 and delivered to a nozzel 11, from which the liquid is controllably dispensed to a user or customer. A typical positive displacement meter 9, as is known in the art, includes a pair of pistons which reciprocate in opposition to one another as the liquid or fluid is passed through the meter 9. In one embodiment of the invention, first and second linear sensing devices 13, 15 are coupled to the top faces of the opposing pistons, respectively, for sensing the linear movement of each one of the pistons within their associated cylinder 17. Electrical output signals from the first and second linear sensors 13, 15 are connected via cables 19, 21, respectively, to a microprocessor 23. The microprocessor 23 is programmed to process the signals from the sensors 13, 15 for determining the total linear distance covered by the opposing pistons during the liquid dispensing cycle. The total distance is then multiplied by the cross-sectional area of the top face of the pistons for determining the total volume of liquid dispensed. Lastly, the price per unit volume is then multiplied by the total volume calculated, and all or selected ones of the volume and/or price are delivered from the microprocessor 23 to an output device (not shown) such as a printer or display, for example.

Figure 2:
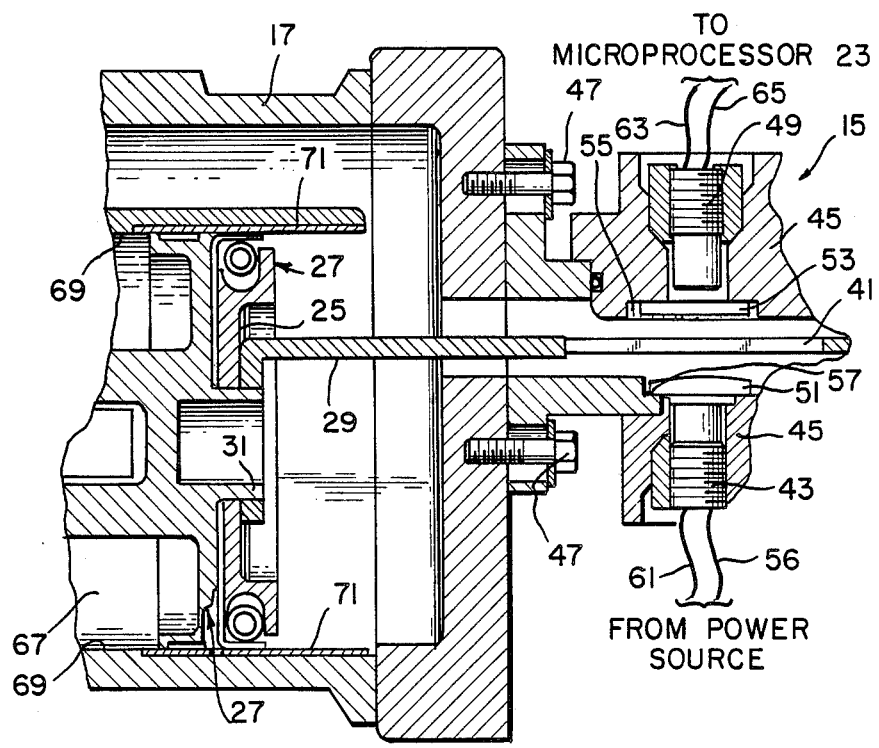
FIG. 2 is a partial cross-section of a positive displacement meter including one embodiment of the present invention.
Figure 3:
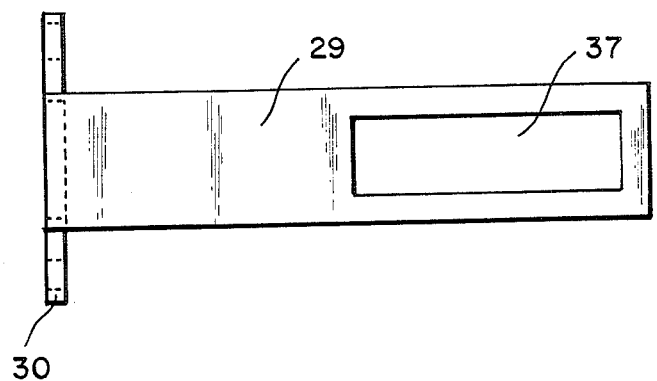
FIG. 3 is a top view of a holder for a diffraction grading of one embodiment of the present invention.
Figure 4:
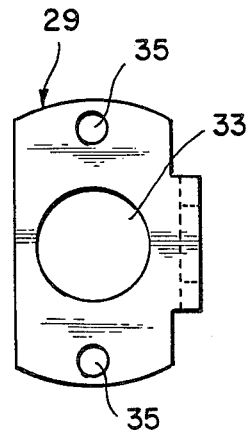
FIG. 4 is a view of the left end of the diffraction grading holder of FIG. 3.
Figure 5:
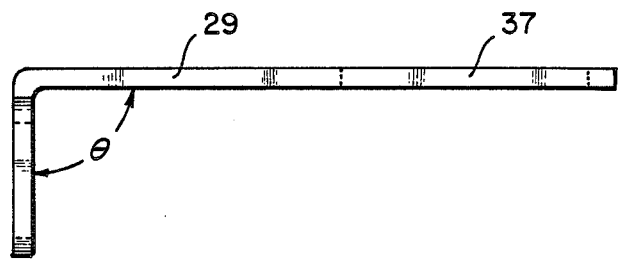
FIG. 5 is an edge view of the diffraction grading holder of FIG. 3.
Figure 6:
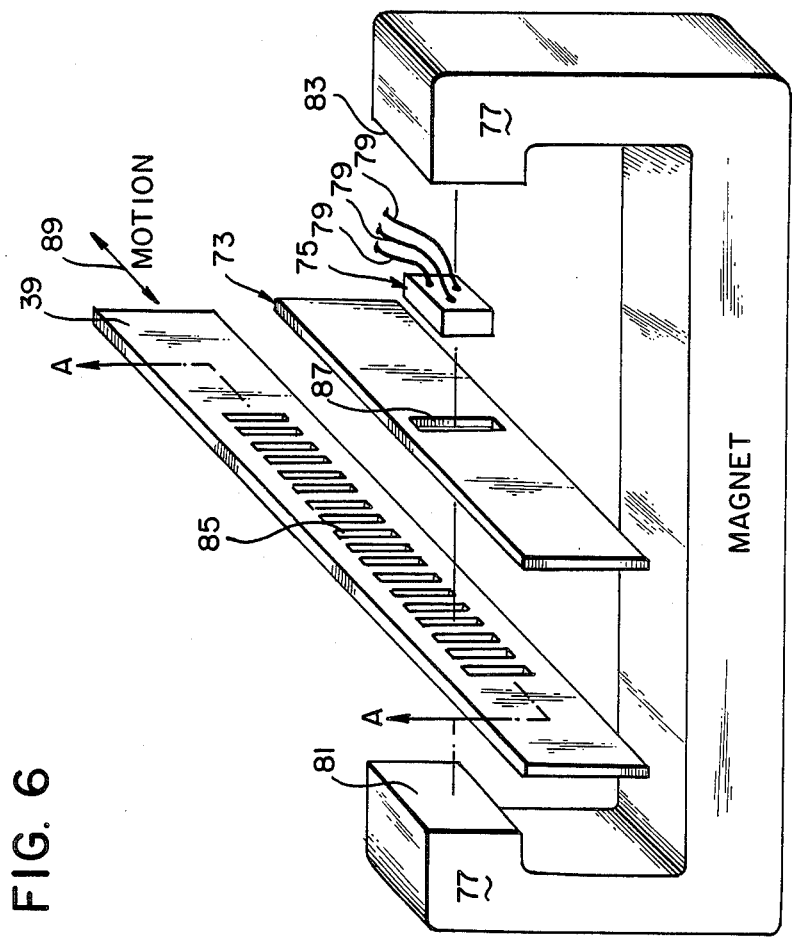
FIG. 6 is an elementary pictorial of another embodiment of the invention.

In FIG. 2, a partial sectional view is shown of one embodiment of the invention as connected to the top face 25 of a piston 27. An elongated rectangular strip-like member 29 is rigidly attached at one end to the face 25 of the piston 27. Note that the rectangular member 29 is partially mounted to a boss-like projection 31 of the piston 27. The top view of member 29 is shown in FIG. 3, whereas a view of the mounting end is shown in FIG. 4, and an edge view thereof is shown in FIG. 5. Note in FIG. 4 that the mounting end of member 29 includes a hole 33 for receiving the bushing-like projection 31 of the piston 27, and two bolt holes 35 (the mounting bolts are not shown in FIG. 2 for sake of simplicity). A rectangular opening 37 is provided in the member 29 for mounting therein a diffraction grading in one embodiment of the invention, or a slotted strip of magnetically permeable material 39, such as shown in FIG. 6 for another embodiment of the invention to be discussed below. For the one embodiment including a diffraction grading rigidly mounted within the rectangular opening 37 of holder 29 may typically be a Moire fringe-type grading, known in the art.

With further reference to FIG. 2, assume that a diffraction grading 41, such as a Moire fringe-type grading is mounted in the holder 29, and that the linear sensor 15 includes a light source 43 mounted within a housing 45 that is bolted by bolts 47 to one end of the positive displacement meter 17, as shown. A light detector 49, such as a phototransistor, for example, is mounted in the linear sensor housing 45 on the other side of the diffraction grading 41 from the light source 43, as shown. Also note that the light source 43 is opposite the light detector 49, whereby light from the light source 43 is passed through a focusing lens 51, through the diffraction grading 41, and another diffraction grading portion 53 mounted in a recessed area 55 of housing 45, and therefrom is received by the light detector 49. Note also that the focusing lens 51 is mounted within another recess 57 of housing 45. The light source 43 receives its electrical energy via a pair of conductors 59, 61 which are connected to a power source (not shown). The light detector 49 converts the diffracted light it receives into electrical signals which are carried by electrical conductors 63, 65 to the microprocessor 23. For the first linear sensor 13 (see FIG. 1) the conductors 63, 65 are carried within cable 19, and for the second linear sensor 15 the conductors 63, 65 are carried within the cable 21. Also, the piston 27 reciprocates within a cylinder 67. A seal is provided between the sides of the piston 27 and the walls 69 of the cylinder 67 via sealing rings 71. A substantially identical mechanical configuration for the other half of the positive displacement meter 17 is associated with the first linear sensor 13. Note that the mounting end 30 of the holder 29 is bent at an angle $\theta$, where in this example the angle $\theta$ is 90°.

In operation of one embodiment of the present invention, the light source 43 is energized for transmitting a beam of light that is alternately diffracted by reciprocal movement of the diffraction grading 41 via movement of the piston 27, whereby the diffracted light is detected by the light detector 49, converted into electrical signals, and provided as an input to the microprocessor 23 for processing. Typically, these signals are in the form of electrical pulses, which are first wave-shaped, e.g. converted to substantially rectangular pulses, within microprocessor 23, and thereafter are counted. Each count or pulse represents a relatively small movement of the piston 27 within the cylinder 67. Over a given period of time, the total number of pulses counted by the microprocessor 23 from the first and second linear sensors 13, 15, is multiplied by the distance each pulse represents for linear movement of piston(s) 27, for obtaining the total linear distance displaced by each piston 27, i.e. only one piston 27 is shown in FIG. 2, but as previously mentioned two pistons 27 moving in opposition are typically provided within a positive displacement meter 17, as in this example. The total distance is then multiplied by the area of a face of a piston 27 for obtaining the volume of liquid or fluid or fluid dispensed over the given period of time. Further processing by the microprocessor 23 might include, as previously mentioned, multiplying the volume of liquid dispensed by the price per unit volume, in order to obtain the total cost to the recipient of the liquid dispensed.

Instead of using a light detection system, such as the Moire fringe diffraction grading system of the one embodiment just described, another embodiment of the invention includes a slotted strip of magnetically permeable material 39, as shown in FIG. 6. With reference to FIG. 2, this second embodiment of the invention, with certain easy mechanical modification to the housing 45, could for example be substituted for the first embodiment, as will be described in conjunction with FIGS. 2 and 6. The slotted strip 39 is substituted for the diffraction grading 41. An aperture strip 73 is substituted for the other portion of the diffraction grading 53. A Hall Effect element 75 replaces the focusing lens 51, and permanent or electromagnets 77 substituted for the light detector 49 and light source 43, respectively. Opposing faces of the magnet 77 would be oppositely poled. Electrical conductors from the Hall Effect element 75 are connected to the microprocessor 23 via cables such as cables 19 and 21 of FIG. 1. In FIG. 6, a permanent magnet 77 is shown for purposes of example, but if instead of permanent magnets 77 electromagnets are used, a source of DC power (not shown) must be provided for supplying appropriate energy or electrical energy to the magnets 77 in a manner for obtaining opposite poles between the opposing faces of the magnet 77, as previously described. A Honeywell Hall Effect element part No. 915512-2, and 1010 CRS electromagnets were used in an engineering prototype, and found to provide satisfactory results. Laboratory tests indicated that as expected, as the clearances between the magnet 77, the Hall Effect device 75, the shutter 39, and aperture 73 was reduced, the amplitude of the electrical signals from the Hall Effect device 75 upon reciprocation of the holder 29 by movement of a piston 27 produced correspondingly greater amplitude electrical signals. Other factors effecting the amplitude of the pulse-like signals produced by the Hall Effect element 75 will depend upon the magnetic permeability of the shutter 39 and aperture 73, the thicknesses of the materials used, the strength of the magnetic field, and the sensitivity of the Hall Effect device 75. With reference to FIG. 6, as the slotted strip 39 is reciprocated back and forth via movement of the piston 27, the magnetic field will be periodically interrupted between one pole 81 and another pole 83 of the magnet or magnets 77. When an open slot 85 of strip 39 is aligned with the aperture 87 of the aperture strip 73, magnetic flux will flow between the magnetic poles 81 and 83, and be detected by the Hall Effect element 75 as a pulse-like signal, assuming continuous reciprocal movement of a slotted strip 39 in the directions of the double arrow 89. A similar effect could be produced by interchanging the slotted strip 39 with the aperture strip 73, whereby the aperture strip 73 would be the movable element and the slotted strip 39 the stationery element. In effect, the reciprocating slotted strip 39 provides an alternating reluctance for the flux path between the Hall element 79 and magnet(s) 77. Processing of the pulse-like signals from the Hall Effect element 79 would be substantially the same as described for the processing of the pulse-like signals from the light detector element 49 of the first embodiment of the invention.

Figure 7:
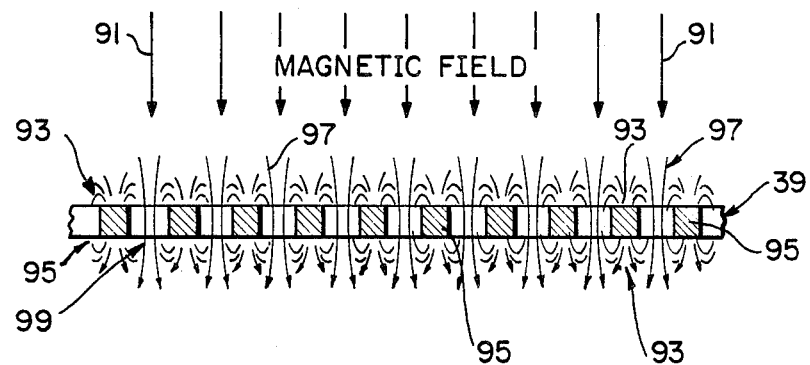
FIG. 7 is a partial cross-section of the slotted strip of FIG. 6 for showing the magnetic flux flow for a high permeability strip.
Figure 8:
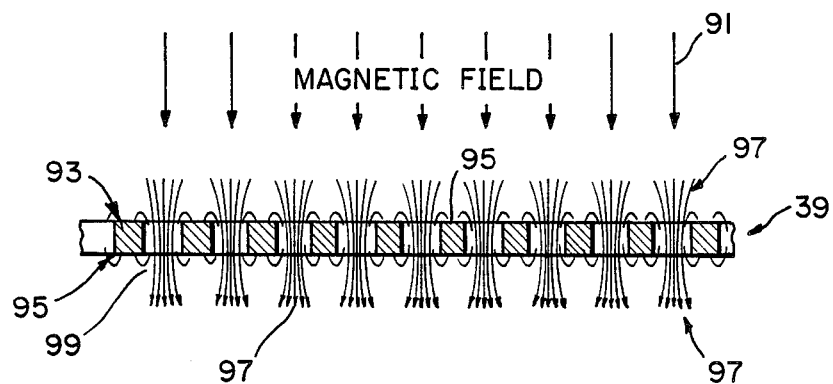
FIG. 8 is a partial cross-section of the slotted strip of FIG. 6 for showing the magnetic flux flow for a strip of low permeability strip.
Figure 9:
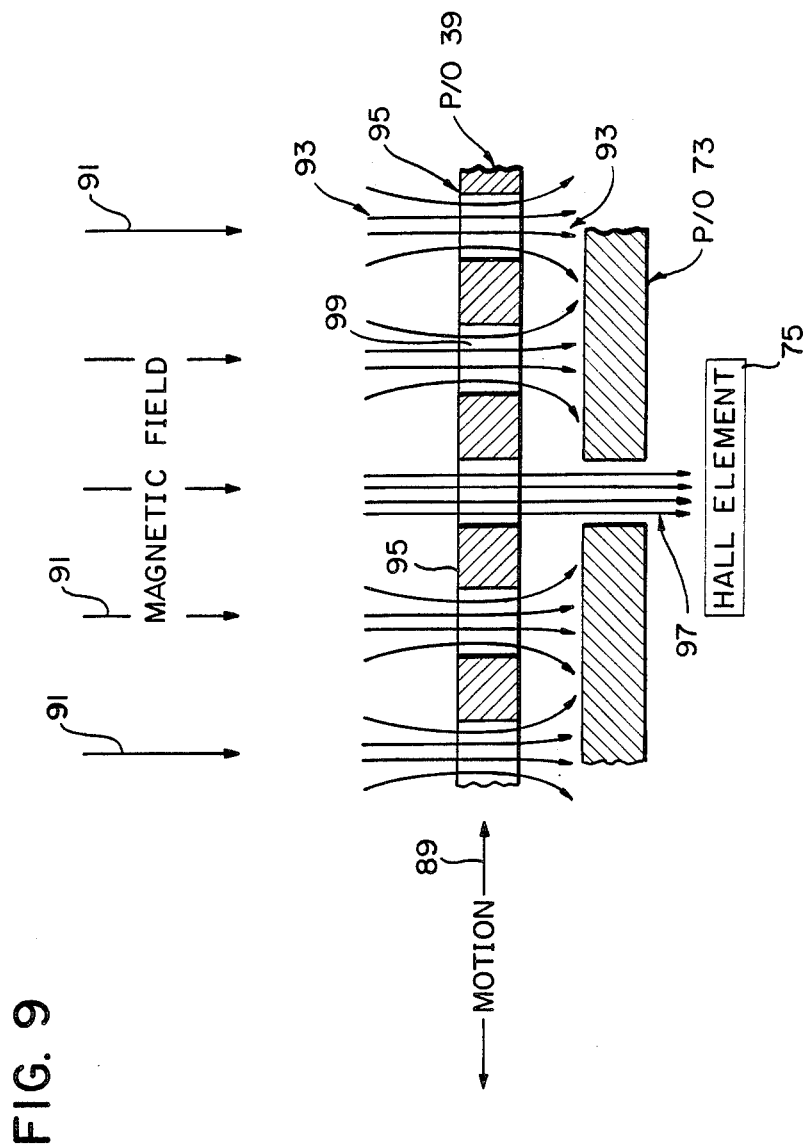
FIG. 9 is an elemental diagram showing the basic operation of the another embodiment of the invention.

In further explanation of the operation of the second embodiment of the invention, with reference to FIG. 7, showing a cross section of the slotted strip 39 fabricated from a high permeability material, a magnetic field represented by flux lines 91 as produced by the magnets 77, would cause an induced field represented by flux lines 93 within the lands 95, as shown. A deflected magnetic field 97 would be produced through the gaps or openings 99 of slotted strip 39. In turn, the induced field 93, in this example of a highly permeable strip 39, creates a strong pulse generating magnetic field about the lands 95. Accordingly, when using a high permeability magnetic material for the slotted strip 39, upon reciprocal movement of the strip 39, the magnetic flux as a result periodically flowing through the aperture 87 of the aperture strip 73 will be the flux emitted from the lands 95. The Hall Effect element 75 will detect this flux as it is intermittently provided through the aperture 87. Contrarywise, as shown in FIG. 8, if the slotted strip 39 is fabricated from a low-permeability material, the induced magnetic flux 93 will be relatively small compared tot he strength of the magnetic flux through the slots or gaps 99. In this latter case, the flux from the gaps 99 will intermittently pass through the aperture 87 for detection by the Hall Effect element 75, for generating the previously-mentioned pulses. An enlarged view of the magnetic flux 93, 97 associated with a low permeability strip as shown in FIG. 9.

For both the first and second embodiments of the invention, a plurality of pairs of detection elements, such as described, may be included in the linear sensors for increasing both the resolution and sensitivity of the measuring system, in addition to providing for quadrature measurements for indicating the direction of movement of the pistons 27 at any given time. A quadrature-type system would permit a differential comparison of signals produced, thereby enhancing the sensitivity and noise immunity of the system.

Although particular elements and methods of operation of the present invention have been particularly described for the first and second embodiments of the invention, they are not meant to be limiting, and variations on the invention as herein described may occur to those skilled in the art which remain within the scope and spirit of the appended claims.

What is claimed is:

1. In a positive displacement meter, including at least a first piston within a cylinder, and apparatus for monitoring the movement of said piston over a given period of time, for determining the volume of fluid passed through the meter during the time period, wherein the improvement consists of linear sensing apparatus comprising relative to each piston of said meter:
   a rectangular strip-like holder rigidly connected at one end to a face of said piston, and having an elongated rectangular hole near its other end;
   a multiwindowed member rigidly mounted within said rectangular hole of said holder;
   emitting means rigidly mounted to said cylinder and positioned opposing one side of said holder, for emitting a form of detectable energy through the windows of said multiwindowed member as the latter reciprocates back and forth with movement of said piston; and
   detecting means rigidly mounted to said cylinder and positioned opposing the other side of said holder for detecting said energy from said emitting means intermittently passing through said windows of said multiwindowed member as the latter reciprocates with movement of said piston, said detecting means providing electrical output signals analogous to the volume displaced by said piston over a given period of time.

2. The improvement of claim 1, further including processor means receptive of said electrical signals, for processing the signals to obtain either one or a combination of the volume of fluid passed through said meter over a given period of time, and the cost of said fluid.

3. The improvement of claim 1, wherein said multiwindowed member consists of a first diffraction grating.

4. The improvement of claim 3, wherein said emitting means includes a light source.

5. The improvement of claim 4, wherein said detecting means includes a photodetector.

6. The improvement of claim 5 further including a second diffraction grating rigidly mounted to said cylinder and positioned between said photodetector and said first diffraction grating.

7. The improvement of claim 3, wherein said first diffraction grating consists of a Moire fringe-type grating.

8. The improvement of claim 6, wherein said second grating consists of a Moire fringe-type grating.

9. The improvement of claim 4, further including focusing lens means mounted to said cylinder and positioned between said light source and said first diffraction grating, for focusing light from said light source upon said first diffraction grating.

10. The improvement of claim 2, wherein said processor means consists of a microprocessor.

11. The improvement of claim 1, wherein said multiwindowed member consists of a strip of relatively low magnetic permeability material having a plurality of successive juxtaposed slot-like openings.

12. The improvement of claim 11, wherein said emitting means includes either one of a permanent or electromagnet, and said detecting means detects the magnetic flux passed through the slot-like openings of said strip of low magnetic permeability material.

13. The improvement of claim 1, wherein said multiwindowed member consists of a strip of relatively high magnetic permeability material having a plurality of successive juxtaposed slot-like openings.

14. The improvement of claim 13, wherein said emmitting means includes either one of a permanent or electromagnet, and said detecting means detects the magnetic flux formed about portions of said strip between said slot-like openings.

15. The improvement of claim 12 or 14, further including aperture means rigidly mounted to said cylinder and positioned between said multiwindowed member and detecting means, for focusing said magnetic flux onto said detecting means.

16. The improvement of claim 15, wherein said detecting means includes a Hall Effect element.

17. In a positive placement meter, including at least a first piston within a cylinder, a method for determining the volume of fluid passed through said meter over a given period of time, via monitoring of the linear movement of said piston(s) comprising relative to each piston of a said meter the steps of:
   transmitting detectable energy perpendicularly across two parallel and opposing horizontal planes located within a space between two separate points, said space being in a volumetric area extending from and outside of said cylinder, the horizontal planes both intersecting a top face of said piston and being parallel to the central axis of said piston
   permitting a predetermined portion of said energy to at all times pass from one of said points through a single aperture in one of said horizontal planes to the other horizontal plane;
   alternately interrupting the flow of said detectable energy between the other of said planes and the other of said two separate points as a linear function of the movement of said piston;
   detecting the alternately interrupted energy; and
   producing electrical signals from said detected energy, the signals being analogous to the volume of fluid passed through said meter over the given period of time.

18. The method of claim 17, further including the step of processing said electrical signals for obtaining the volume of the fluid passed through said positive displacement meter over the given period of time.

19. The method of claim 18, further including the step of multiplying the volume obtained by the price per unit volume for obtaining the cost of the fluid passed through said meter over the given period of time.

* * * * *